: 3,130,223
PROCESS FOR PREPARING PHENACETIN
William R. Surine and Wesley C. Stoesser, Midland, Mich., assignors to The Dow Chemical Company, Midland, Mich., a corporation of Delaware
No Drawing. Filed Oct. 21, 1960, Ser. No. 63,951
7 Claims. (Cl. 260—541)

The present invention relates to a new and useful method for preparing phenacetin. More particularly the present invention concerns a new and useful process for preparing phenacetin in high yields, and high purity not heretofore achievable. In addition the process is amenable to the recovery of by-product acetic acid by direct recovery procedures.

It is an object of the present invention to produce phenacetin in high yields without the use of expensive starting products. It is a further object of the present invention to prepare high purity phenacetin without repeated recrystallization and purification procedures. These and other objects will become apparent to those skilled in the art from reading the following specification and claims.

It has now been found that phenacetin can be prepared in high yields and high purity by reacting para-phenetidine with acetic anhydride in the presence of recycle liquor containing acetic acid, acetic anhydride and phenacetin at temperatures from about 0° to about 120° C. under an inert atmosphere. Good results are obtained when the para-phenetidine is added to the acetic anhydride. Reverse order of addition is to be avoided because the phenacetin tends to precipitate out during addition. This condition necessarily interferes with heat transfer and agitation as well as promoting the formation of colored impurities and undesirable by-products. It is to be understood that the para-phenetidine employed as a starting reactant is a nearly colorless commercial product and that the acetic anhydride employed herein is of a commercial grade usually containing acetic acid. The presence of acetic acid is not harmful, indeed, it is preferred that acetic acid be present in the reaction medium, thus being available subsequently for use as the crystallizing solvent. Since acetic acid is present in the anhydride, in the recycle liquor and is made as a by-product, addition of other chemically inert diluents, to promote crystallization, which in themselves require recovery, making the process less economical, is avoided. Further, these diluents often tend to form azeotropic mixtures with acetic acid, making its recovery difficult and expensive. The by-product acetic acid produced during reaction can be retained in the reaction mixture or the excess over that desired for recycle can be recovered in a relatively pure state by simple distillation. It is desirable to maintain the concentration of acetic acid in the reaction medium, via recycle material, at from about 0.5 to 4 moles per mole of phenetidine introduced. The amount of excess over that produced in the reaction is only limited by the handling requirements and the size of equipment available; more than 4 moles excess of acetic acid per mole of phenetidine can be employed but is usually not desirable since the reaction medium becomes too large to handle. Less than an excess of 0.5 moles of acetic acid per mole of phenetidine is not desirable because the mixture becomes very thick and difficult to handle during crystallization.

Likewise, it is desirable when carrying out the process of the present invention to employ an excess of acetic anhydride over that theoretically required to react with the phenetidine, and preferable to employ about a molar excess of acetic anhydride over that theoretically required to react with the phenetidine. The employment of an excess of acetic anhydride has been observed to favorably affect the yields and color of the product. It has also been observed that if colored impurities appear to be present it is oftentimes advantageous to operate the process in or near the lower half of the temperature range and to blanket the reaction medium with an inert atmosphere such as nitrogen.

Recovery of the desired phenacetin is accomplished by crystallization from the acetic acid rich reaction mixture. The resulting crystals are separated by filtration or decantation, washed with acetic acid to displace the mother liquor, then with water to remove the acetic acid. The washed crystals are dried and ground to obtain a white phenacetin product meeting USP standards. The drying and grinding may be conducted as separate operations. However, when so conducted it has been found necessary to dry the crystals, grind them, and then re-dry the ground material. If the drying and grinding are carried out in a simultaneous operation the result achieved is equivalent and one step is eliminated. The mother liquor and acetic acid wash are combined and distilled to recover a portion of the acetic acid and to reduce the volume of the mixture to that amount desired for recycling to the reactor. It is often advantageous to add a small amount of activated charcoal during the acetic acid distillation step to insure removal of any colored impurities from the liquid. The activated charcoal is then removed by filtration when the still liquor is transferred to the reactor for recycling. To terminate a recycle series, mother liquor and acetic acid wash from the last phenacetin filtration can be distilled to recover the acetic acid and acetic anhydride and the still residue discarded as tar. The following flow diagram is illustrative of the process contemplated by the present invention.

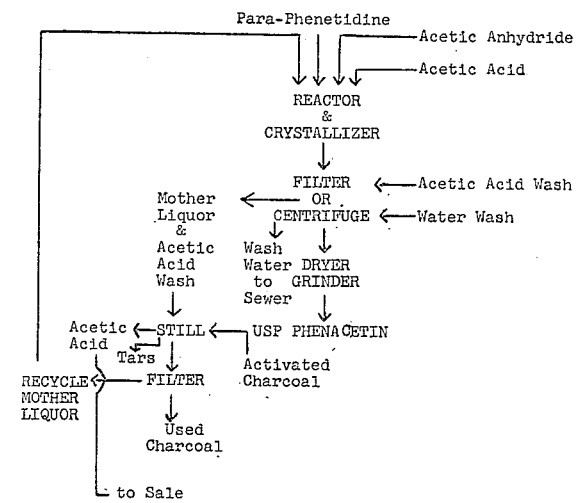

The following examples are illustrative of the present invention but are not to be construed as limiting.

*Example 1.—Cycle 1*

Following the flow diagram above, 274.4 grams of para-phenetidine was added in a portionwise manner over about a one-half hour period to a mixture of 220.0 grams of acetic anhydride and 180.0 grams of acetic acid maintained under a $CO_2$ atmosphere at a temperature of about 50° to 55° C. Upon completion of the addition of the para-phenetidine the temperature of the reactor was raised to about 83° C. to insure dissolution of the phenacetin in the reaction mixture. On cooling the phenacetin began crystallizing out at about 73° C. The slurry was then cooled to 15° C., the crystals recovered on a filter, washed with 60.0 grams of acetic acid, and then washed with water. The washed cake was dried and ground to yield 319.4 grams, an 89.2 percent yield, of USP phenacetin having a melting pointing of 134°–135° C.

The mother liquor and acetic acid wash were combined and distilled to reduce liquor weight to 300.0 grams for recycle in Example 1—Cycle 2. The distillate consisted of 51.6 grams of acetic acid.

Example 1.—Cycle 2

To the 300 g. of recycle liquor from Cycle 1 was added 210.0 grams of acetic anhydride in the reactor, and 274.4 grams of para-phenetidine was added portionwise under the same conditions as in Cycle 1. The reaction, crystallization, filtration and recycle liquor-acetic acid recovery were identical as before. As a result of these operations there was recovered 349.7 grams of USP phenacetin and 122.2 grams of acetic acid distillate. The total phenacetin recovery for both cycles was 669.1 grams for a cumulative yield of 92.5 percent.

The following table shows the results of eight additional cycles using the procedure of Cycle 2.

| Cycle No.<br>Material | 3 | 4 | 5 | 6 | 7 | 8 | 9 | 10 |
|---|---|---|---|---|---|---|---|---|
| In: | | | | | | | | |
| p-Phenetidine _____ grams__ | 274.4 | 274.4 | 274.4 | 274.4 | 274.4 | 274.4 | 274.4 | 274.4 |
| Acetic Anhydride _____ do____ | 216.0 | 220.0 | 216.0 | 216.0 | 216.0 | 216.0 | 216.0 | 216.0 |
| Acetic Acid Wash _____ do____ | 60 | 60 | 60 | 60 | 60 | 60 | 60 | 60 |
| Mother Liquor _____ do____ | 300 | 300 | 300 | 300 | 300 | 300 | 300 | 300 |
| Out: | | | | | | | | |
| Phenacetin, grams _____ | 349.9 | 355.1 | 353.6 | 351.1 | 354.6 | 358.0 | 355.4 | 354.3 |
| Cycle Yield, Percent _____ | 97.5 | 99.0 | 98.7 | 98.0 | 99.0 | 99.9 | 99.1 | 98.8 |
| Cumulative Yield, percent _____ | 94.8 | 95.9 | 96.3 | 96.7 | 97.0 | 97.4 | 97.6 | 97.7 |
| Acetic Acid Distillate Per Cycle _____ | 132.2 | 134.4 | 138.4 | 130.0 | 129.4 | 132.9 | 128.6 | _____ |
| Cumulative Acetic Acid Distillate _____ | 306.0 | 440.4 | 578.8 | 708.8 | 838.2 | 971.1 | 1,099.7 | _____ |

Each batch of crystals passed USP standards. It is thus seen that, even after ten cycles, USP phenacetin is being made in very close to quantitative yields.

A study of the acetic acid figures show that at the end of the ninth cycle 1099.7 grams recovered minus 720.0 grams added gives a net recovery of 379.7 grams. This value divided by the theoretical amount of acetic acid made (1080 grams) gives 35% recovery of the byproduct acetic acid made. The amount of acetic acid in the recycle liquor going to the tenth cycle if recovered would bring this recovery to over 60%. Most of the 40% loss of the acetic acid byproduct occurs because it is held in the cake on filtration and is washed to the sewer with water. In commercial practice this loss can be reduced by the use of centrifugal wheels rather than filters.

Example 2

In the manner of Example 1, Cycle 1, the following runs were made at various temperatures employing the indicated gram weights of reactants to obtain the following yields of USP phenacetin.

| | 1 | 2 | 3 | 4 | 5 | 6 |
|---|---|---|---|---|---|---|
| Reaction Temperature, °C _____ | 20 | 30 | 50 | 80 | 100 | 130 |
| Acetic Anhydride __ | 112 | 105.5 | 210 | 210 | 210 | 210 |
| Acetic Acid _____ | 120 | 90 | 180 | 180 | 180 | 180 |
| Acetic Acid Wash __ | 60 | 40 | 80 | 80 | 90 | 60 |
| Para-Phenetidine ___ | 137.2 | 137.2 | 174.4 | 274.4 | 274.4 | 274.4 |
| Percent Phenacetin Yield _____ | 81.3 | 88.2 | 87.8 | 86.8 | 85.4 | 83.7 |

It is thus seen that the reaction temperature can vary from about 20° C. to about 130° C. with only minor variations in yields. However, it was found that higher temperatures promote the formation of colored impurities so that it is desirable to maintain the temperature within the range of 20° to 80° C.

Example 3

In the manner of Example 1, Cycle 1 the following runs were made at 80° C. employing the indicated gram weights of reactants to obtain the following yields of USP phenacetin.

| | 1 | 2 | 3 | 4 |
|---|---|---|---|---|
| Acetic Anhydride _____ | 210.0 | 220.0 | 228.7 | 234.0 |
| Acetic Acid _____ | 180 | 170 | 180 | 180 |
| Acetic Acid Wash _____ | 90 | 80 | 90 | 90 |
| Para-Phenetidine _____ | 274.4 | 274.4 | 274.4 | 274.4 |
| Percent Phenacetin Yield _____ | 88.3 | 87.6 | 86.1 | 85.5 |

It is thus seen that the phenacetin yields decrease slightly as the amount of acetic anhydride increases. It is desired that the process employ an excess of acetic anhydride. It was found that the formation of colored impurities is at a minimum when an excess of 10 to 15 molar percent acetic anhydride, based on the phenetidine reacted, is used. So this is the desired operating range. However, any excess from 1% to 100% can be used, the excess being recycled with the motor liquor recycle portion and the anhydride used in the next recycle reduced accordingly.

The amount of acetic acid present is not critical. It should be present in amount sufficient to give a slurry which can be handled easily.

We claim:

1. In a process for preparing phenacetin which comprises reacting by contacting at between about 20° to about 130° C. para-phenetidine with acetic anhydride, the improvement which consists of carrying out the reaction in the presence of acetic acid in an amount of at least 0.5 mole percent of phenetidine in excess of that produced during the reaction and crystallizing the phenacetin directly from the acetic acid rich reaction mixture; recovering the crystallized phenacetin; recovering a portion of the acetic acid by distillation of the mother liquor; and, recycling the resulting concentrated mother liquor obtained to the reaction.

2. The process of claim 1 wherein the reaction is carried out at from about 30° to about 80° C.

3. The process of claim 1 wherein the acetic anhydride is employed in an amount of from about 1 to 100 percent in excess of that theoretically required to react with the phenetidine.

4. The process of claim 1 wherein the acetic anhydride is employed in from 10 to 15 percent excess over that theoretically required to react with the phenetidine.

5. The process of claim 1 wherein the reaction is conducted under an atmosphere inert toward the reactants and reaction products under the reaction conditions.

6. The process of claim 1 wherein the recovery of byproduct acetic acid is carried out in the presence of activated charcoal.

7. The process of claim 1 wherein the acetic acid present in the reaction is maintained in from 0.5 to 4 mole excess over that produced in the reaction.

References Cited in the file of this patent
UNITED STATES PATENTS

| 2,337,825 | Larh et al. _____ | Dec. 28, 1943 |
| 2,642,397 | Morway et al. _____ | June 16, 1956 |
| 2,887,513 | Eaker et al. _____ | May 19, 1959 |
| 2,945,870 | Young _____ | July 19, 1960 |

UNITED STATES PATENT OFFICE
CERTIFICATE OF CORRECTION

Patent No. 3,130,223 April 21, 1964

William R. Surine et al.

It is hereby certified that error appears in the above numbered patent requiring correction and that the said Letters Patent should read as corrected below.

Column 4, line 19, for "motor" read -- mother --; line 43, for "0.5 mole percent" read -- 0.5 mole per mole --.

Signed and sealed this 27th day of October 1964.

(SEAL)
Attest:

ERNEST W. SWIDER
Attesting Officer

EDWARD J. BRENNER
Commissioner of Patents